(12) United States Patent
Komissarchik et al.

(10) Patent No.: US 8,051,405 B2
(45) Date of Patent: Nov. 1, 2011

(54) SYSTEM AND METHOD FOR BUILD SCRIPT GENERATION IN A SOFTWARE DEVELOPMENT ENVIRONMENT

(75) Inventors: Konstantin Komissarchik, Woodinville, WA (US); Theodore Bashor, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1338 days.

(21) Appl. No.: 11/619,360

(22) Filed: Jan. 3, 2007

(65) Prior Publication Data

US 2007/0174814 A1 Jul. 26, 2007

Related U.S. Application Data

(60) Provisional application No. 60/757,942, filed on Jan. 11, 2006.

(51) Int. Cl.
*G06F 9/44* (2006.01)
*G06F 9/45* (2006.01)

(52) U.S. Cl. .................. 717/115; 717/106; 717/139

(58) Field of Classification Search .................. None
See application file for complete search history.

(56) References Cited

U.S. PATENT DOCUMENTS

| | | | | |
|---|---|---|---|---|
| 5,640,566 A * | 6/1997 | Victor et al. | ................. | 717/113 |
| 6,233,725 B1 * | 5/2001 | Beadle et al. | ................. | 717/118 |
| 6,477,444 B1 * | 11/2002 | Bennett et al. | ................. | 700/245 |
| 6,487,713 B1 * | 11/2002 | Cohen et al. | ................. | 717/105 |
| 6,622,302 B1 * | 9/2003 | Delaney et al. | ................. | 717/170 |
| 6,957,236 B1 * | 10/2005 | Ganesh et al. | ................. | 1/1 |
| 7,003,759 B2 * | 2/2006 | Jameson | ................. | 717/120 |
| 7,032,212 B2 * | 4/2006 | Amir et al. | ................. | 717/124 |
| 7,222,333 B1 * | 5/2007 | Mor et al. | ................. | 717/115 |
| 7,266,817 B1 * | 9/2007 | Barrett | ................. | 717/174 |
| 7,389,492 B2 * | 6/2008 | Chupa et al. | ................. | 717/106 |
| 7,403,934 B2 * | 7/2008 | Polizzi | ................. | 1/1 |
| 7,437,712 B1 * | 10/2008 | Brown et al. | ................. | 717/122 |
| 7,472,376 B2 * | 12/2008 | Burcham et al. | ................. | 717/113 |
| 7,640,533 B1 * | 12/2009 | Lottero et al. | ................. | 717/108 |
| 7,694,291 B2 * | 4/2010 | Chen et al. | ................. | 717/162 |
| 7,831,614 B2 * | 11/2010 | Deffler | ................. | 707/779 |
| 2004/0172637 A1 * | 9/2004 | Koutyrine | ................. | 719/328 |
| 2005/0210389 A1 * | 9/2005 | Middelfart | ................. | 715/730 |

OTHER PUBLICATIONS

Steven Knight, "Building Software Wtih SCons", 2005 IEEE, pp. 79-88.*
Vldimir Prus, "The Boost.Build System", 2009, Proceedings of the Third Spring Young Researchers' Colloquium on Software Engineering, pp. 35-40.*
Michael Cymerman, "Automate your build process using Java and Ant", 2005, JavaWorld.com, pp. 1-10.*
Dennis Morse, et al., "make—GNU make utility to maintain groups of programs", Aug. 22, 1989, http://unixhelp.ed.ac.uk/CGI/man-cgi?make, pp. 1-4.*

* cited by examiner

*Primary Examiner* — Tuan Dam
*Assistant Examiner* — Xi D Chen
(74) *Attorney, Agent, or Firm* — Squire, Sanders & Dempsey (US) LLP

(57) ABSTRACT

A system and method for build script generation in a software development environment. An extensible script generator framework allows for one or more script generators to be plugged into the framework. When the framework is subsequently invoked to build a software project or application, each of the plugged-in generators can be evaluated to see if one or more generators should be applied to that project or application. The applicable generators are then used during the build process to automatically generate a build script. In some embodiments, a command line interface allows the generator framework to be invoked outside of the IDE. Additionally, in some embodiments, the framework allows for the plugin of one or more customizers that can be used to further customize or tweak the build script.

18 Claims, 3 Drawing Sheets

SYSTEM AND METHOD FOR BUILD SCRIPT GENERATION IN A SOFTWARE DEVELOPMENT ENVIRONMENT

CLAIM OF PRIORITY

This application claims the benefit of U.S. Provisional Patent Application entitled "SYSTEM AND METHOD FOR BUILD SCRIPT GENERATION IN A SOFTWARE DEVELOPMENT ENVIRONMENT" Application No. 60/757,942, filed Jan. 11, 2006, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to software development, and particularly to a system and method for build script generation in a software development environment.

BACKGROUND

Many of today's enterprise-level software applications or "enterprise applications" are developed to run on computer servers known as "application servers", an example of which is the WebLogic Server product (WebLogic) from BEA Systems, Inc. WebLogic is also an example of a Java 2 Enterprise Edition (J2EE) application server, i.e. it conforms to Java standards. Other application servers exist that also conform to these standards. To assist in developing applications, each of the various application server products typically includes an integrated software development counterpart (IDE), that assists the software developer in developing applications. For example, WebLogic includes an IDE known as WebLogic Workshop. WebLogic Workshop provides an intuitive programming model that allows the developer to focus on building the business logic of the application rather than on complex implementation details. Whether the developer is an application developer with a business problem to solve, or an expert J2EE developer building business infrastructure, WebLogic Workshop makes it easier to design, test, and deploy enterprise-class applications.

WebLogic Workshop comprises two main parts: the Workshop Integrated Development Environment (IDE) itself, and a Workshop runtime environment. The IDE simplifies the complexity in building applications for the entire WebLogic platform, since applications that are built in the IDE can be constructed from high-level components rather than low-level API calls. The applications can then be executed in the Workshop runtime environment. These applications typically expose systems and data using a combination of web applications and web services. For example, a company might want to expose shipment scheduling, tracking and billing data to it's business partners via web services, so that it's partners' applications can then access the data directly. The company might also want to expose tracking information via one or more web applications, so that shipment originators and recipients can check the status of their shipments using a web browser. WebLogic Workshop makes it easy to construct a common functionality for both applications, and then expose that functionality with the appropriate interfaces.

An application usually contains one or more "projects". Projects are used to expose enterprise application logic via a user interface. Components within a project may reference each other, but generally they may not reference components in other applications. In this manner an enterprise application is different from a web application. The term "web application" generally refers to a collection of resources, typically HTML or JSP pages, that allow users to access functionality via the Internet or web. An enterprise application may contain one or more web applications. In WebLogic Workshop, there are a large variety of project types. Web Projects are constructed from Java Server Pages (JSPs), which can interact with server resources to produce dynamic content. Control Projects and Java controls are entities that contain business logic, or provide convenient access to enterprise resources. A control project may be used to construct and package controls that are intended for use by components in other projects. A Control Deliverable Project can be used to build Java controls that are then distributed to multiple users. A control deliverable project creates directories that store help and sample files relating to the control. Workshop then packages the controls of that project into a Java Archive (JAR) file along with the help and sample files. EJB Projects and Enterprise Java Beans (EJBs) are Java software components of enterprise applications, as defined by the J2EE Specification. An EJB Project provides support for creating and deploying new EJBs. A Java project allows development of general-purpose Java code that is not directly part of special entities such as web services, controls or EJBs. The product of a Java project is a JAR file that holds Java classes that need to be accessed from other parts of the application. A Schema project provides convenient, automatic access to BEA Systems' XMLBeans functionality. Portal Projects are used to provide a single point of access to enterprise applications and information that can be based on user, group and role attributes. A Datasync project is used to develop and manage general purpose portal services that are used in the development of personalized applications and portals, including user profiles, user segments, events, request properties, session properties, content selectors, placeholders, and campaigns. A Business Process Project allows the execution of business logic and the exchange of business documents among back-end systems, users and trading partners (systems and users) in a loosely coupled fashion.

Before an application can be executed, it must be "built". How often a particular project must be built depends on the particular type of project. For example, if the developer is developing a web service, page flow, or JSP file in a Web or Web Service project, then they will not need to build the project that contains those files until they are ready to deploy the project. Web and Web Service projects can also be built incrementally. Java projects, control projects, EJB projects, and Schema projects are similar in that the result of building any of these projects is a JAR file that is written to the application's APP-INF/lib or class folder, which can then be used by other projects within the application. These projects are built when the JAR files need to be updated, so that the latest changes are available to any projects that are using them. Typically, the entire application needs to be built only when it is being deployed to a server. During the application build, the developer will perform a clean operation and then build the full application to generate an EAR file. Applications will probable be rebuilt again prior to deployment of the application to a production environment, or files are changed across multiple projects, especially if there may be dependencies between them. Depending on the size of the application, the application build process can take a long time, and may need to be repeated several times.

The WebLogic Workshop environment allows a developer to customize the way in which projects are built, including through the use of a tool called "Ant" ("Another Neat Tool"), developed by the Apache Software Foundation. Ant is a Java-based build tool, similar to a software "Make" utility, designed for use with both application-level and project-level Ant build files. If a developer wants to customize the way WebLogic Workshop builds an individual project, then they can use the Workshop IDE to export the ANT build file that Workshop then uses to build that project. When they then build the project, WebLogic Workshop will use the custom build file to create the project JAR. Similarly, if the developer wants to customize the way WebLogic Workshop builds an entire application, they can use the WebLogic Workshop IDE to export the ANT XML build file for the application. The exported Ant file contains a set of standard tasks and targets for managing the build for the application. Whereas make-like tools are inherently shell-based, evaluating a set of dependencies and then executing commands not unlike what the developer would issue on a shell; Ant can be extended using Java classes, and instead of writing shell commands, the configuration files can be XML-based, calling a target tree wherever various tasks get executed.

On of the problem with Ant-based scripting, or indeed any scripting language that is used for building applications, is that it typically must be invoked within the IDE. Most build-script tools cannot run within a command-line interface. Furthermore, a script is difficult to generate by hand, requiring the talents of a skilled programmer. If the script must be subsequently customized or tweaked, then another skilled programmer will have to take up that task. The net result is that, while build scripts such as Ant greatly assist in the application build and deployment process, they lack a flexibility and ease of use. Furthermore, there is no means to automatically generate the script to suit a particular project or application. This is the area that the present invention is directed to.

SUMMARY

As disclosed herein, an embodiment of the invention provides a system and method for build script generation in a software development environment. An extensible script generator framework allows for one or more script generators to be plugged into the framework. When the framework is subsequently invoked to build a software project or application, each of the plugged-in generators can be evaluated to see if one or more generators should be applied to that project or application. The applicable generators are then used during the build process to automatically generate a build script. In some embodiments, a command line interface allows the generator framework to be invoked outside of the IDE. Additionally, in some embodiments, the framework allows for the plugin of one or more customizers that can be used to further customize or tweak the build script.

DETAILED DESCRIPTION

As disclosed herein, an embodiment of the invention provides a system and method for build script generation in a software development environment. An extensible script generator framework allows for one or more script generators to be plugged into the framework. When the framework is subsequently invoked to build a software project or application, each of the plugged-in generators can be evaluated to see if one or more generators should be applied to that project or application. The applicable generators are then used during the build process to automatically generate a build script. In some embodiments, a command line interface allows the generator framework to be invoked outside of the IDE. Additionally, in some embodiments, the framework allows for the plugin of one or more customizers that can be used to further customize or tweak the build script.

Figure 1:
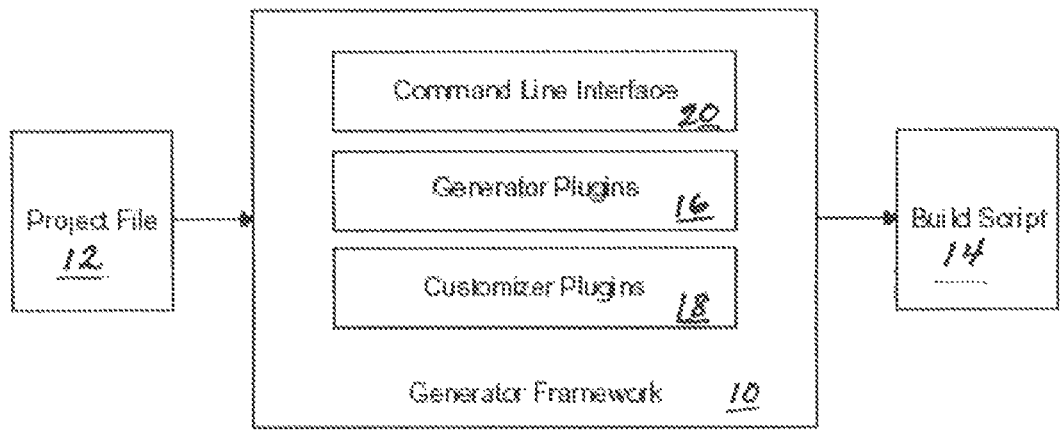
FIG. 1 shows an illustration of a system for build script generation, in accordance with an embodiment of the invention.

FIG. 1 shows an illustration of a system for build script generation, in accordance with an embodiment of the invention. As shown in FIG. 1, the generator framework 10, which may be deployed on a computer server, including for example a WebLogic server, or WebLogic Workshop server, allows for receiving a project file 12, to create a build script 14. The generator framework allows script generators 16 to be plugged-in, or registered, with the framework. In accordance with an embodiment, either a single one or a plurality of script generators can be registered. Each script generator can be based on Ant ("Another Neat Tool", developed by the Apache Software Foundation), or can be based on a different scripting language, such as Perl, Make, or Maven. In accordance with an embodiment, the generator framework also allows a single one or a plurality of script customizers 18 to be plugged-in, or registered, with the framework. Script customizers can be used to customize or tweak the operation, or the output, of the script generators. The framework further includes a command-line interface 20, or some alternate developer interface or means of specifying an input project file. As the file is received into the system, each generator is assessed to determine whether or not it applies to the input file. If it is determined to be applicable, then the generator, together with any appropriate customizer, is used to build a script for the project/application. The build script is then output for subsequent use in building and deploying the application.

In accordance with an embodiment, during operation of the framework, each generator plugin can make its own determination as to whether it is applicable to the input project file, or whether it is compatible to that project file. If the generator determines it is applicable/compatible, then the generator is invoked on the file. In accordance with some embodiments, as described in further detail below, interim scripts may be generated by the generators, which scripts are then customized by the customizers prior to outputting the final build script. In a WebLogic Workshop environment, the generator framework can be implemented by exposing extension points for the generator and customizer. These extension points are then used by the plugins to extend the framework with additional script generators and additional customizers.

Figure 2:
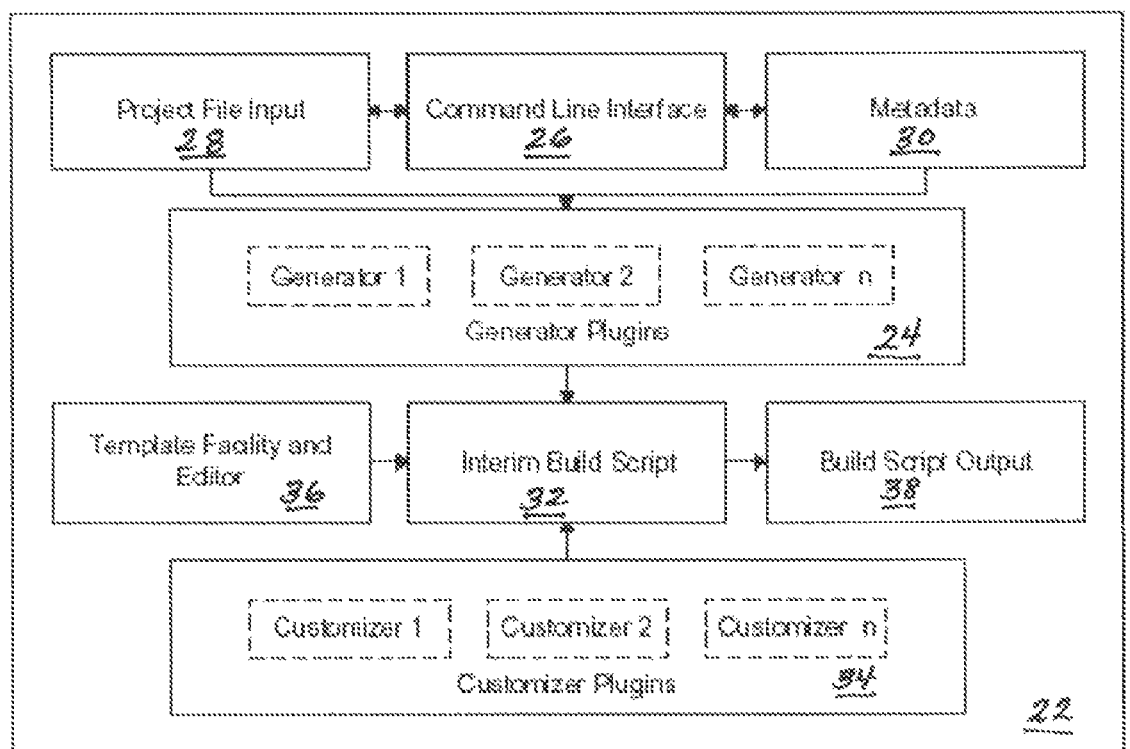
FIG. 2 shows an illustration of a generator framework for use in build script generation, in accordance with an embodiment of the invention.

FIG. 2 shows a detailed illustration of a generator framework for use in build script generation, in accordance with an embodiment of the invention. As shown in FIG. 2, the generator framework 22 (equivalent to the generator framework 10 shown in FIG. 1) comprises, or allows access to, a plurality (i.e. one or more) of script generator plugins 24. A command line interface 26 allows the developer to specify a project file input 28. In this embodiment, the benefit of the command line interface includes that the project or application can be built without having to start the graphical IDE. This is of particular benefit in a production environment since it assists in quickly deploying a modified application to the production server. Optionally, a metadata 30 can be used to further customize the operation of the generators. Metadata includes data used by the script that is not related to the actual logic of the script. Keeping the metadata in a separate place allows developers to change the script logic and metadata independently, so that features of the script can be modified without the underlying logic being overwritten. As the project input file is received, each of the generators are queried as to their applicability, and the applicable generators are invoked to generate an interim build script 32. The generator framework further comprises, or allows access to, a plurality (i.e. one or more) of generator customizer plugins 34. In accordance with an embodiment, a line-based templating facility and editor 36 allows the software developer to create templates for use with the generators. Within a template, insertion points can be defined. At each insertion point a customizer can be invoked to replace the contents of the script therein with customized script code or text. In accordance with an embodiment, the customizers can invoked in a particular order or priority. The benefit of the customizers include that they do not require any actual modification to the script generators. In this manner, a variety of script generators can be plugged into the generator framework, and can be subsequently customized or tweaked for application-specific situations. In accordance with an embodiment, the customizers modify the interim build script. The build script 38, as customized is then output for subsequent use in building and deploying the application.

Figure 3:
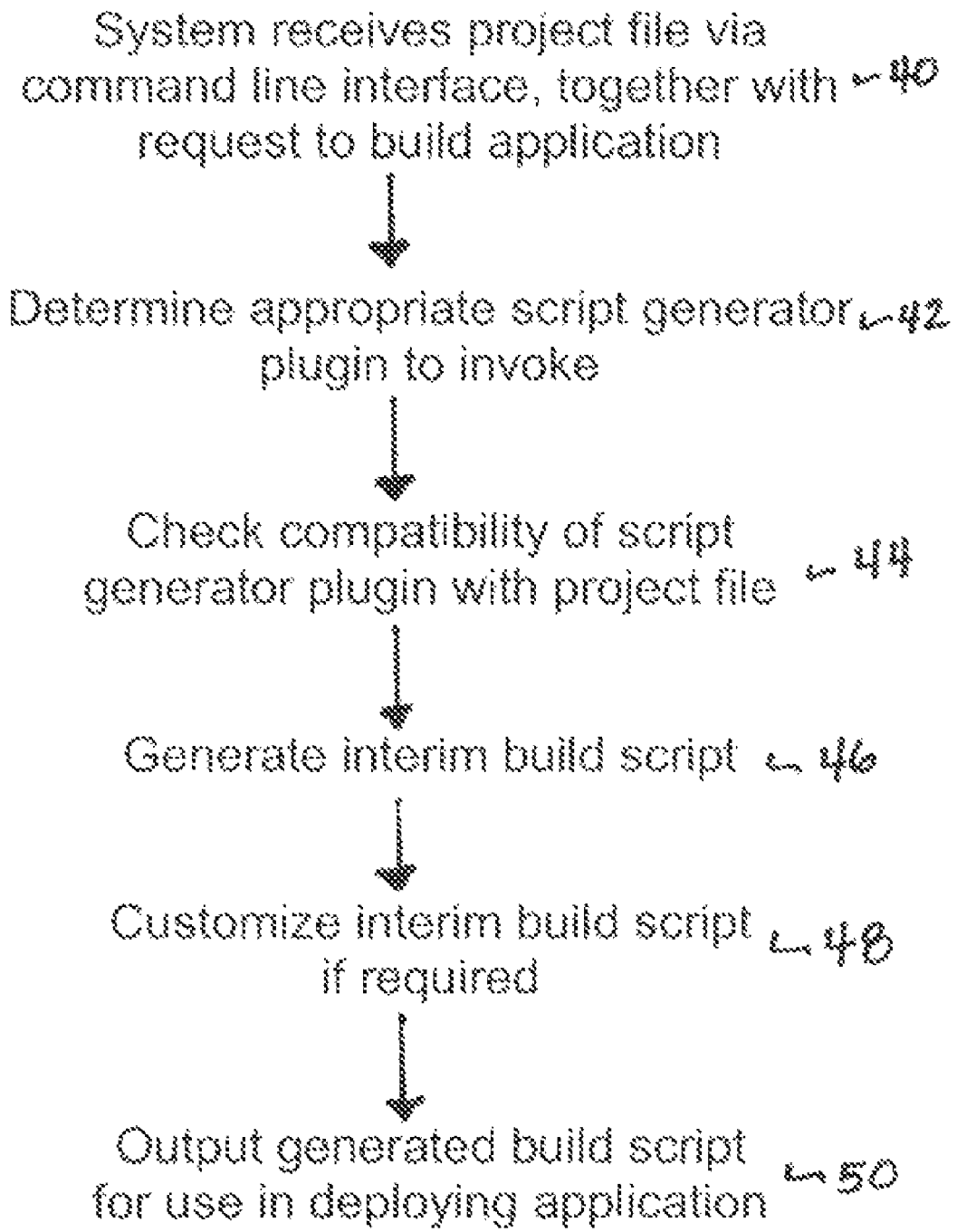
FIG. 3 shows a flowchart of a process of build script generation, in accordance with an embodiment of the invention.

FIG. 3 shows a flowchart of a process of build script generation, in accordance with an embodiment of the invention. As shown in FIG. 3, in step 40, the system or script generator framework receives a project file via a command line interface, together with a request to build a software project or application. In step 42, the system determines the appropriate script generator plugins. to invoke. This may also include checking extension points for the availability of new generators. In step 44, the compatibility of each script generator plugin is matched against the project file. In step 46, the system generates an interim build script, using a selection of the script generators as applicable. In step 48, the system invokes any of a plurality of customizers to customize the interim build script. This may also include checking extension points for the availability of new customizers. In step 50, the generated build script is output for use in deploying the software application.

Figure 4:
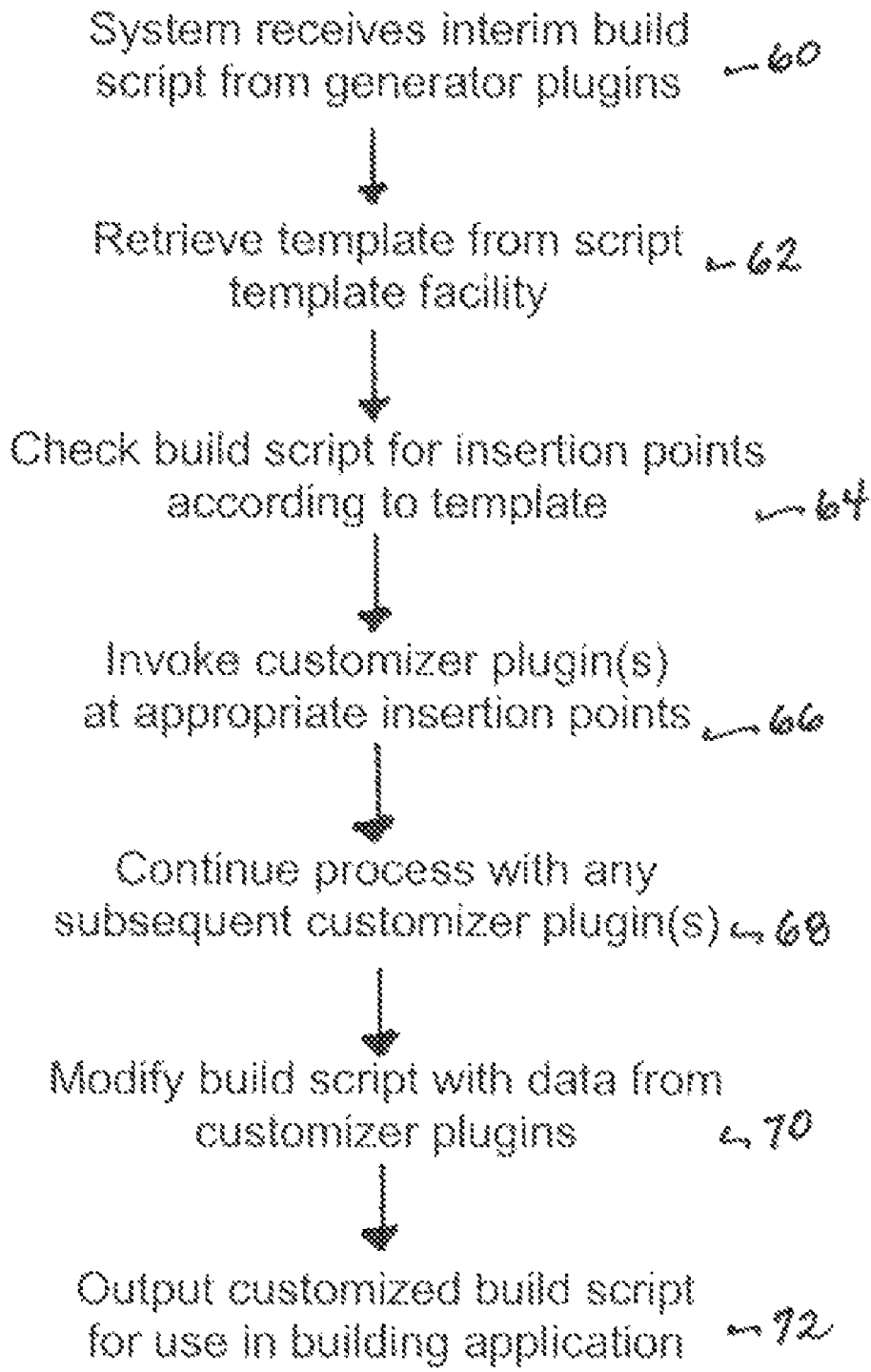
FIG. 4 shows a flowchart of a process of build script customization during generation, in accordance with an embodiment of the invention.

FIG. 4 shows a flowchart of a process of build script customization during generation, in accordance with an embodiment of the invention. As shown in FIG. 4, in step 60, the system or script generator framework receives an interim build script, as generated by the generator plugins. In step 62, an appropriate template is retrieved from the script template facility. In step 64, the interim build script is checked for insertion points according to the template. In step 66, one or more customizer plugin(s) are invoked at the appropriate insertion points, to replace the script code or text therein with the customized code or text. In step 68, the process continues with any subsequent customizer plugin(s) In step 70, the build script is modified with data from the customizer plugins, and in step 72 is output for use in deploying the software application.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for build script generation for software projects and applications, comprising:
    a computer server;
    a developer interface, deployed on the computer server, that allows a software developer to specify a project or application input file as an input into the system;
    a plurality of script generators, deployed on the computer server, wherein at least one of the plurality of script generators is applied to the input file to generate an interim build script for the project or application;
    a plurality of generator customizers, deployed on the computer server, wherein at least one of the plurality of generator customizers modifies the interim build script; and
    an output interface, deployed on the computer server, that outputs the interim build script as a build script, as modified by the generator customizers, for subsequent use in building the project or application;
    wherein each of the plurality of script generators directly reads the input file to independently determine its applicability to the input file, and if the script generator is applicable the script generator then assists in generating the interim build script, otherwise the script generator abstains from the script generation, wherein the determining applicability of the script generator does not involve invoking the script generator; and wherein the applicability of each of the script generators is first determined, and the determined applicable script generators are invoked to assist in generating the interim build script.

2. The system of claim 1, wherein the developer interface is a command line interface.

3. The system of claim 1, further comprising:
a metadata that can be used to further customize the operation of the generators separately from the actual logic of the script.

4. The system of claim 1, further comprising:
a line-based templating facility and editor that allows the software developer to create templates for use with the generators.

5. The system of claim 1, wherein a template and insertion points can be defined, wherein at each insertion point one or more of the plurality of customizers can be invoked to replace the contents of the interim script therein with customized script code or text.

6. The system of claim 1, wherein one or more of the plurality of customizers can be invoked in a particular order or priority.

7. A method for build script generation for software projects and applications, comprising the steps of:
providing a developer interface that allows a software developer to specify a project or application input file as an input;
providing a plurality of script generators, wherein at least one of the plurality of script generators is applied to the input file to generate an interim build script for the project or application;
providing a plurality of generator customizers, wherein at least one of the plurality of generator customizers modifies the interim build script; and
outputting the interim build script as a build script, as modified by the generator customizers, for subsequent use in building the project or application;
wherein each of the plurality of script generators directly reads the input file to independently determine its applicability to the input file, and if the script generator is applicable the script generator then assists in generating the interim build script, otherwise the script generator abstains from the script generation, wherein the determining applicability of the script generator does not involve invoking the script generator; and
wherein the applicability of each of the script generators is first determined, and the determined applicable script generators are invoked to assist in generating the interim build script.

8. The method of claim 7, wherein the developer interface is a command line interface.

9. The method of claim 7, further comprising:
a metadata that can be used to further customize the operation of the generators separately from the actual logic of the script.

10. The method of claim 7, further comprising:
a line-based templating facility and editor that allows the software developer to create templates for use with the generators.

11. The method of claim 7, wherein a template and insertion points can be defined, wherein at each insertion point one or more of the plurality of customizers can be invoked to replace the contents of the interim script therein with customized script code or text.

12. The method of claim 7, wherein one or more of the plurality of customizers can be invoked in a particular order or priority.

13. A computer readable medium, including instructions stored thereon which when executed cause a computer to perform steps comprising:
providing a developer interface that allows a software developer to specify a project or application input file as an input;
providing a plurality of script generators, wherein at least one of the plurality of script generators is applied to the input file to generate an interim build script for the project or application;
providing a plurality of generator customizers, wherein at least one of the plurality of script generators is the interim build script; and
outputting the interim build script as a build script, as modified by the generator customizers, for subsequent use in building the project or application;
wherein each of the plurality of script generators directly reads the input file to independently determine its applicability to the input file, and if the script generator is applicable the script generator then assists in generating the interim build script, otherwise the script generator abstains from the script generation, wherein the determining applicability of the script generator does not involve invoking the script generator; and
wherein the applicability of each of the script generators is first determined, and the determined applicable script generators are invoked to assist in generating the interim build script.

14. The computer readable medium of claim 13, wherein the developer interface is a command line interface.

15. The computer readable medium of claim 13, wherein a template and insertion points are defined, wherein at each insertion point one or more of the plurality of customizers are invoked to replace the contents of the interim script therein with customized script code or text.

16. The computer readable medium of claim 13, wherein one or more of the plurality of customizers are invoked in a particular order or priority.

17. The computer readable medium of claim 13, the steps further comprising further comprising:
providing a metadata that further customizes the operation of the generators separately from the actual logic of the script.

18. The computable readable medium of claim 13, the steps further comprising further comprising:
providing a line-based templating facility and editor that allows the software developer to create templates for use with the generators.

* * * * *

UNITED STATES PATENT AND TRADEMARK OFFICE
CERTIFICATE OF CORRECTION

| | | |
|---|---|---|
| PATENT NO. | : 8,051,405 B2 | Page 1 of 1 |
| APPLICATION NO. | : 11/619360 | |
| DATED | : November 1, 2011 | |
| INVENTOR(S) | : Komissarchik et al. | |

It is certified that error appears in the above-identified patent and that said Letters Patent is hereby corrected as shown below:

On the Title Page, Item (56) under "Other Publications", column 2, line 1, delete "Wtih" and insert -- With --, therefor.

In column 2, line 65, delete "probable" and insert -- probably --, therefor.

In column 5, line 42, delete "plugins." and insert -- plugins --, therefor.

In column 5, line 64, after "plugin(s)" insert -- . --.

In column 8, line 49, in Claim 17, after "steps" delete "further comprising".

In column 8, line 54, in Claim 18, after "steps" delete "further comprising".

Signed and Sealed this
Thirty-first Day of January, 2012

David J. Kappos
*Director of the United States Patent and Trademark Office*